United States Patent [19]

Glück

[11] Patent Number: 4,672,435
[45] Date of Patent: Jun. 9, 1987

[54] OBSERVATION AND RECONNAISSANCE SYSTEM FOR ARMORED VEHICLES

[75] Inventor: Wolfgang Glück, Kissing, Fed. Rep. of Germany

[73] Assignee: Krauss-Maffei A.G., Fed. Rep. of Germany

[21] Appl. No.: 757,685

[22] Filed: Jul. 22, 1985

[30] Foreign Application Priority Data

Jul. 21, 1984 [DE] Fed. Rep. of Germany ....... 3426946

[51] Int. Cl.[4] .............................................. H04N 7/18
[52] U.S. Cl. ...................................... 358/89; 358/108; 89/41.05
[58] Field of Search ............................ 358/89, 108, 93; 89/41.05

[56] References Cited

U.S. PATENT DOCUMENTS

| | | | |
|---|---|---|---|
| 3,504,122 | 3/1970 | Ratliff | 358/88 |
| 3,659,920 | 5/1972 | McGlasson | 358/87 |
| 3,671,966 | 6/1972 | Fluhr | 343/6.5 R |
| 3,689,695 | 9/1972 | Rosenfield | 358/108 |
| 4,355,328 | 10/1982 | Kulik | 358/87 |
| 4,462,045 | 7/1984 | Norris | 358/87 |
| 4,518,990 | 5/1985 | Giluydis | 358/108 |
| 4,570,530 | 2/1986 | Armstrong | 358/108 |

FOREIGN PATENT DOCUMENTS

| | | |
|---|---|---|
| 3024330 | 1/1982 | Fed. Rep. of Germany . |
| 3106100 | 9/1982 | Fed. Rep. of Germany . |
| 3134012 | 9/1983 | Fed. Rep. of Germany . |
| 3417666 | 11/1984 | Fed. Rep. of Germany . |

Primary Examiner—Howard W. Britton
Attorney, Agent, or Firm—Robert J. Koch

[57] ABSTRACT

An observation and reconnaissance system to improve the all-around automatic vision in an armored vehicle. The system is equipped with an image device mounted on a telescope mast or the like outside the armored vehicle. The image signals are transmitted in a spatially true manner to image display devices positioned semispherically around an observer within the armored vehicle.

20 Claims, 3 Drawing Figures

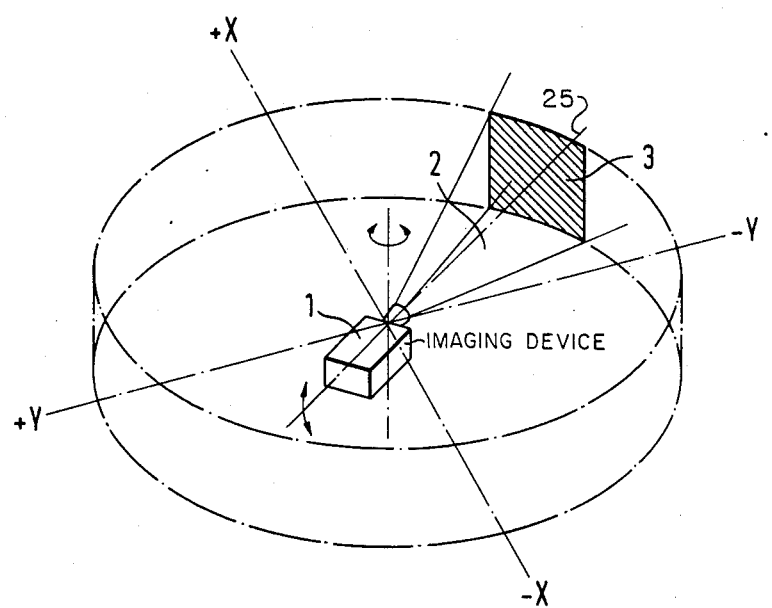

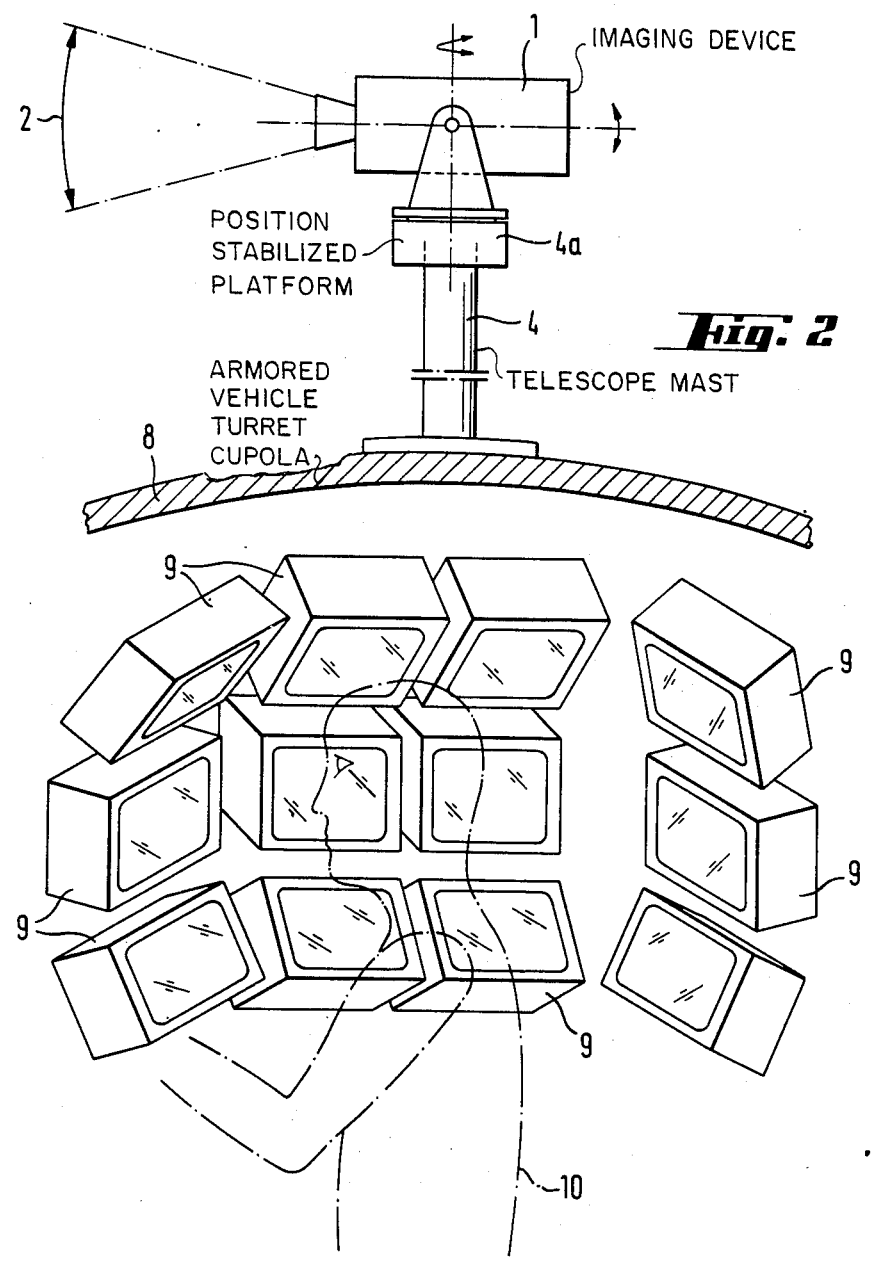

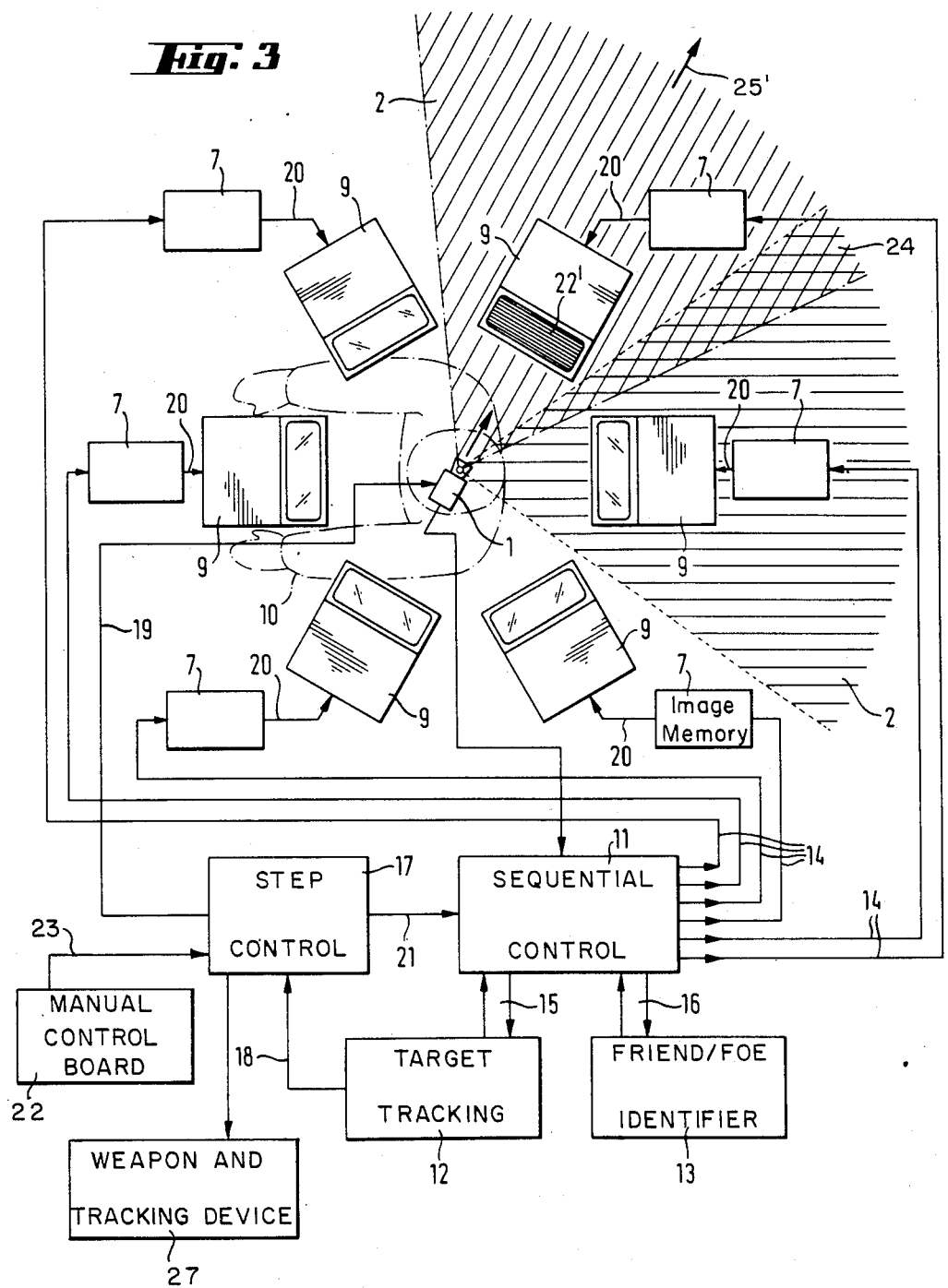

OBSERVATION AND RECONNAISSANCE SYSTEM FOR ARMORED VEHICLES

BACKGROUND OF THE INVENTION

1. Field of the Invention.

The invention relates to an observation and reconnaissance system.

2. Description of the Prior Art.

In a known observation and reconnaissance system according to West German application No. 31 34 012 angular mirrors are arranged in a circle around the hatch, the beam paths of which pass through the armored roof into the turret and are reflected into the plane of vision of an observer seated therein. In this manner, an all-around panoramic view is to be provided for the observer, limited to a certain elevation over the azimuthal plane only. The combat area above the armored vehicle, the observation of which is important for defense against aerial attacks, cannot be viewed with this angular mirror layout. For this reason, the angular mirror mounted in the principal "forward" direction of observation may be pivoted in elevation, together with the accessory reconnaisance instruments, such as day and night visual displays, target sights and the like. Observation and reconnaissance possibilities remain limited by this condition. In hilly terrain, which in view of the cover it offers, is preferred by armored vehicles, vision in the azimuthal direction is limited to the immediate vicinity. In order to be able to see "behind the hill", it is known to extend a special reconnaissance device by means of a telesxope arm, but in a "periscope" of this type positional orientation is lost and operation of such a "periscope" in the restricted space of a tank turret is awkward.

SUMMARY OF THE INVENTION

An object of the present invention is to provide an observation and reconnaissance system for an improved panoramic view while fully maintaining positional orientation and which makes it possible to observe, practically without gaps, the combat area above the armored vehicle. It is a further object to overcome the restriction of the prior systems to day-time operation. It is further intended to combine this improved observation and reconnaissance system with reconnaissance systems already present in most cases in the armored vehicle, such as target tracking systems, friend/foe identification systems, into an effective unit in order to optimize combat conditions in an armored vehicle.

In the system according to the invention an imaging device is positioned outside the armored vehicle, preferably in a height adjustable manner. The imaging device may be mounted on an optionally stabilized platform or a telescope or pivot arm or a combination of such arms. The imaging device is freely movable in azimuth and elevation. Its motion is effected by means of adjusting means, for example servomotors, which are capable of automatically moving the imaging device in a plane desired (azimuthal plane or an elevation plane) in accordance with a preselected sequential program. The automatic stepping movement or cycling may be manually overridden in order to continuously observe an object detected by the imaging device in different magnification steps of the imaging optics.

In the case of an automatic stepping sequence a natural reference feature is provided such as a celestial direction or a terrestrial reference point, such as an outstanding terrain feature, grid north, the vehicle's own axis, or the like. The pivoting angle overridden per stepping sequence is chosen in keeping with the combat area to be observed, the opening angle of the optical imaging device and the number of the display devices or monitors positioned around an observer inside the armored vehicle.

The number of monitors is determined in turn by the combat area to be observed, the opening angle of the optical imaging device and the degree of overlap of the images taken in successive imaging steps of space sectors.

The monitors for the display of space sectors during the pivoting of the imaging device in the azimuth plane are grouped in a horizontal plane circularly or in the form of a wreath around the observer, with said horizontal plane passing through the vision plane of the observer. The monitors for the reproduction of space sectors during the pivoting of the imaging device in one or more elevation planes are located above the observer. Realistic orientation and ready observation in the compartment, together with an accurate evaluation of the individual combat space sectors may be effected by means of the electrical coupling of the prevailing position of the imaging device with the point of reproduction of the monitor instantaneously actuated by image signals. The image signals picked up instantaneously are therefore distributed (by means of an appropriate electronic sequence control) so that the imaging device and the monitor actuated by the image signals are pointing in the same spatial direction. In keeping with the stepwise motion of the imaging device the positionally associated monitors are actuated sequentially. Preferably, an electronic image memory is assigned to each monitor. Image signals are read into said memories in keeping with the stepwise actuation of the monitor. The reproduction of stored image signal on the associated monitor is maintained until the next image signal is supplied by the sequential control means.

The retention time of the imaging device between the individual steps, i.e., the step sequence frequency, may be programmed so that a low step frequency results quasi-stationary images and a high step frequency results in moving film images without flickering.

The imaging device and its stepwise actuation may be controlled by a target tracking device so that the target object being tracked is always visible on one of the monitors, whereby positional orientation is maintained even with a moving target.

A further advantageous possibility comprises coupling the sequence control for the distribution of the image signals over the individual monitors and their respective memories, with a friend/foe identification installation, in order to furnish the observer an acoustic and/or optical warning signal upon the appearance of an enemy object.

The invention shall be explained below in more detail with reference to the drawings.

BRIEF DESCRIPTION OF THE DRAWINGS

FIG. 1 shows a perspective view of an imaging device mounted on the outside of an armored vehicle with an observation sector upon the pivoting of the imaging device in the azimuthal plane;

FIG. 2 shows a schematic view of the observation and reconnaissance system, and

FIG. 3 shows a top view of the image display devices grouped in the turret around and observer, together with a schematic block diagram of the electronic components for the image signal actuation of the image display devices.

DETAILED DESCRIPTION OF THE PREFERRED EMBODIMENT

In FIG. 1, the symbol 1 designates an imaging device, which may be in the form of a television camera or heat sensitive camera. The term "imaging device" may include a plurality of cameras designed for pivoting motion in different planes. In the example shown, the imaging device 1 is moved in the azimuthal plane (X-Y plane), whereby in view of the opening angle 2 of the pickup optics a reproduction of the image plane 3 may be produced or picked up.

The imaging device 1 is mounted in the example of embodiment shown in FIG. 2 on the position stabilized platform 4a of a telescope mast 4 and may be moved thereon freely by adjusting means (servomotors), not shown, in azimuth and elevation. The mast 4 is mounted at an appropriate location on the armored vehicle 8, which is indicated in FIG. 2 schematically only by a section of the cupola of the turret.

The image signals produced by the imaging device 1 are conducted by cable or telemetry to a sequential control installation 11 indicated schematically in FIG. 3, which distributes the incoming image signals in keeping with the spatial position of the imaging device 1 over image display devices or monitors 9 within the turret.

The monitors 9, as seen in FIGS. 2 and 3, are arranged in a semispherical distribution around the observer 10 within the turret and display on their screens an image of the horizon as seen by the imaging device 1 in an altitude position chosen above the armored vehicle. In particular in a hilly terrain, this horizon is extending substantially farther than the horizon visible from the armored vehicle so that even the terrain "behind the hill" may be seen without the need for the cumbersome extension of a "periscope". It is essential that by virtue of the spherical distribution of the monitors 9 an orientation of the observer 10 true to the actual conditions is assured. The monitors 9 are actuated by image signals from the sequential control 11 (FIG. 3), so that the alignment of the imaging device 1 in its as indicated by the line of sight 25 in FIG. 1 instantaneous position coincides exactly with the position in space of the monitor 9 being actuated (as shown by the arrow 25' in FIG. 3). The sequential control 11 receives from a stepwise sequencing circuit 17 through the connection 21 the prevailing location information in regard to the alignment of the imaging device 1. The sequence control 11 distributes in keeping with said location information the image signals of the imaging device 1 to one of its outlets 14, leading to a monitor 9 associated with it. In the embodiment of FIG. 3 the monitors 9 are preceded by an electronic image memory 7, which stores an incoming image signal and displays it by way of the line 20 on the subsequent monitor 9, until the next image signal is supplied by the sequence control 11.

The stepping control circuit 17 controls over a circuit 19 the adjusting installation (servomotors) of the imaging device 1 in keeping with an automatic, programmable stepping cycle or the control command of a target tracking installation 12. The stepping cycle can be interrupted by the observer 10 through the use of a manual control board 22, if for example it is desired to inspect a space sector 2 closer, in particular by adjusting the focus of the optical imaging means. This may be accomplished by continuous or stepwise variable enlargement stages. The manual control board is connected by line 23 with the stepwise sequence control 17.

The programming of the stepping control circuit 17 determines the stepping distance and the sector width, together with the cycle frequency, these parameters may also be selected manually by the observer 10. In case of an override of this automatic stepping circuit by the target tracking installation 12 the imaging device 1 is caused to track a target in the manner of the weapon 27 or weapons of the armored vehicle. The observer 10 is able to follow the movements of the target object beyond his monitor "horizon" and therefore is always provided with the necessary spatial orientation, which may be of decisive importance, in particular in regard to the timing of fire.

For the above-mentioned override of the automatic stepping switch, the target tracking installation 12 is connected over a control circuit 18 to the stepping circuit 17. The target tracking installation 12 is further connected to the sequencing control by means of a bidirectional control line 15 to obtain the number of the space sector from the sequencing control. With the help of this number of the space sensor, the target tracking circuit 12 carries the imaging device 1 to the individual area sector through the override of the stepping circuit 17 which was identified through the respective space sector number.

In order to include the monitors 9 in an existing friend/foe identification installation 13 (FIG. 3), the latter is connected by means of a bidirectional control line 16 with the sequencing control 11. In case of the appearance of a hostile object, an optical and/or acoustic warning signal may be produced in the monitor involved.

The display screens of the monitors 9 may be provided with exchangeable target marking, line markings, reticules and the like (not shown), for the ranging of the targets displayed.

In order to avoid blind intervals in the automatic stepping circuit, an overlapping area 26 (FIG. 3) is maintained between two sectors 2 and 22 scanned in succession.

What is claimed is:

1. Observation and reconnaissance system for armored vehicles, comprising:
   an imaging device for generating image signals mounted on the outside of the armored vehicle;
   means for controlling said imaging device in free motion in at least two spatial coordinate directions from inside the armored vehicle in a sequenced stepwise manner for scanning sectors of a combat area, said combat area divided into a plurality of sectors;
   an image display installation electrically coupled with the imaging device, said image display installation comprising a pluality of image display devices at least corresponding to the number of sectors to be scanned and arranged in an approximately circular pattern for the directional display of images, in an azimuthal plane around an observer in an internal compartment of the armored vehicle, wherein said image display devices are responsive to said image signals for displaying an image with the stepwise sequence of the imaging device;

electronic image memory means for storing an image signal and causing a corresponding image to be displayed until a subsequent image signal is stored in said memory means, coupling each display device to said imaging device.

2. An observation and reconnaissance system as in claim 1, wherein the imaging device further comprises means for generating image signals at a plurality of continuously variable enlargement stages.

3. An observation and reconnaissance system as in claim 1, wherein the imaging device further comprises stepping sequence circuit means for controlling the scanning sequence of the imaging device wherein successive scanning sectors are overlapping in a boundary zone.

4. An observation and reconnaissance system as in claim 1, wherein the imaging device may be pivoted stepwise in elevation planes wherein each step corresponds to an elevation sector and the image display installation further comprises a plurality of image display devices corresponding to the elevation sectors arranged above the aximuthal plane inside the armored vehicle, with said image display devices responsive to said image signals for displaying an image in accordance with the stepwise sequencing of the imaging device in the elevation plane correlated with it.

5. An observation and reconnaissance system as in claim 1, wherein the imaging device comprises a television camera and that target markings or reticules are provided on the screens of the image display devices.

6. An observation and reconnaissance system as in claim 1, further comprising a friend/foe identification means coupled to the imaging device for emitting an alarm signal to the display device associated with the sector being scanned upon an appearance of a hostile object in a sector being scanned.

7. An observation and reconnaissance system as in claim 1, wherein the imaging device is connected by telemetry with the image display device.

8. An observation and reconnaissance system as in claim 1, wherein the imaging device further comprises means for generating image signals at a plurality of stepwise variable enlargement stages.

9. An observation and reconnaissance system as in claim 1, wherein the imaging device comprises a thermal imaging camera and that target markings or reticules are provided on the screens of the image display devices which comprise thermal imaging displays.

10. An observation and reconnaissance system as in claim 1, further comprising target tracking means for controlling said imaging device.

11. An observation and reconnaissance system as in claim 10, further comprising at least one weapon means coupled to said imaging device for automatically following the scanning motion of the imaging device.

12. An observation and reconnaissance system as in claim 1, wherein the imaging device is mounted on a position stabilized platform.

13. An observation and reconnaissance system as in claim 12, wherein the position stabilized platform is mounted on a telescope arm.

14. Apparatus for observing a combat area from an armored vehicle located within the area wherein the combat area is divided into a plurality of radial sectors comprising:

imaging means for sequentially generating image signals corresponding to viewed sectors;

means for displaying image signals including a plurality of monitor means, corresponding to the plurality of sectors, surrounding an observation point each for displaying the image signal of a corresponding sector;

step control means coupled to the imaging means for manual and automatic sequence control of said imaging means;

sequential control means, responsive to said step control means, for receiving said image signal from said imaging means and distributing said signal to the corresponding monitor means.

15. An apparatus as in claim 14, wherein each radial sector comprises a plurality of elevation sectors including an azimuthal sector; and wherein said means for displaying includes a monitor means corresponding to each elevation sector in each radial sector; and wherein said step control means further controls said imaging means along an azimuth and elevation axis.

16. An apparatus as in claim 15, wherein each monitor means further comprises means for storing and outputting a received image signal until a subsequent image signal is received.

17. An apparatus as in claim 16 further comprising means for tracking a target and overriding the sequence control of said imaging means coupled to said step control means and said sequential control means.

18. An apparatus as in claim 17 further comprising a friend/foe identification means coupled to said sequential control means for emitting an alarm signal to the monitor means corresponding to a sector in which a hostile object is detected.

19. An apparatus as in claim 18, wherein the sectors partially overlap.

20. An apparatus as in claim 18, wherein the imaging means is mounted on a telescoping arm.

* * * * *